United States Patent [19]
Hormel et al.

[11] Patent Number: 5,337,042
[45] Date of Patent: Aug. 9, 1994

[54] VEHICLE COMMUNICATIONS NETWORK TRANSCEIVER, TRANSMITTER CIRCUIT THEREFOR

[75] Inventors: Ronald F. Hormel, Clinton Township; Frederick O. Miesterfeld, Troy, both of Mich.

[73] Assignee: Chrysler Corporation, Highland Park, Mich.

[21] Appl. No.: 951,988

[22] Filed: Sep. 28, 1992

[51] Int. Cl.⁵ ............................................. H04Q 1/00
[52] U.S. Cl. .......................... 340/826.08; 340/825.63; 375/22
[58] Field of Search ............... 340/825.08, 825.63; 375/22; 307/517, 234; 328/58

[56] References Cited

U.S. PATENT DOCUMENTS

| | | | |
|---|---|---|---|
| 4,620,312 | 10/1986 | Yamashita | 375/22 |
| 4,700,360 | 10/1987 | Visser | 375/22 |
| 4,712,061 | 12/1987 | Lach | 375/22 |
| 5,119,045 | 6/1992 | Sato | 375/22 |
| 5,144,265 | 9/1992 | Petzold | 375/22 |
| 5,208,559 | 5/1993 | Jordan | 307/234 |

*Primary Examiner*—Donald J. Yusko
*Assistant Examiner*—Brian Zimmerman
*Attorney, Agent, or Firm*—Wendell K. Fredericks

[57] ABSTRACT

A transceiver device for use with a microcontroller and a symbol encoder decoder device (forming a node in a communications network) for transmitting and receiving variable pulse width modulated (VPWM) analog signals containing symbol messages over a communications bus. The transceiver accepts digital VPWM signals from the symbol encoder decoder device which were generated by the microcontroller and converts the digital signals into VPWM analog signals and then transmits the analog signal over the bus to other nodes. The transceiver also receives VPWM analog signals placed on the bus by other nodes of the network and transfers the signals in digital form to the symbol encoder decoder device which, in turn, communicates the decoded messages to the microcontroller.

8 Claims, 3 Drawing Sheets

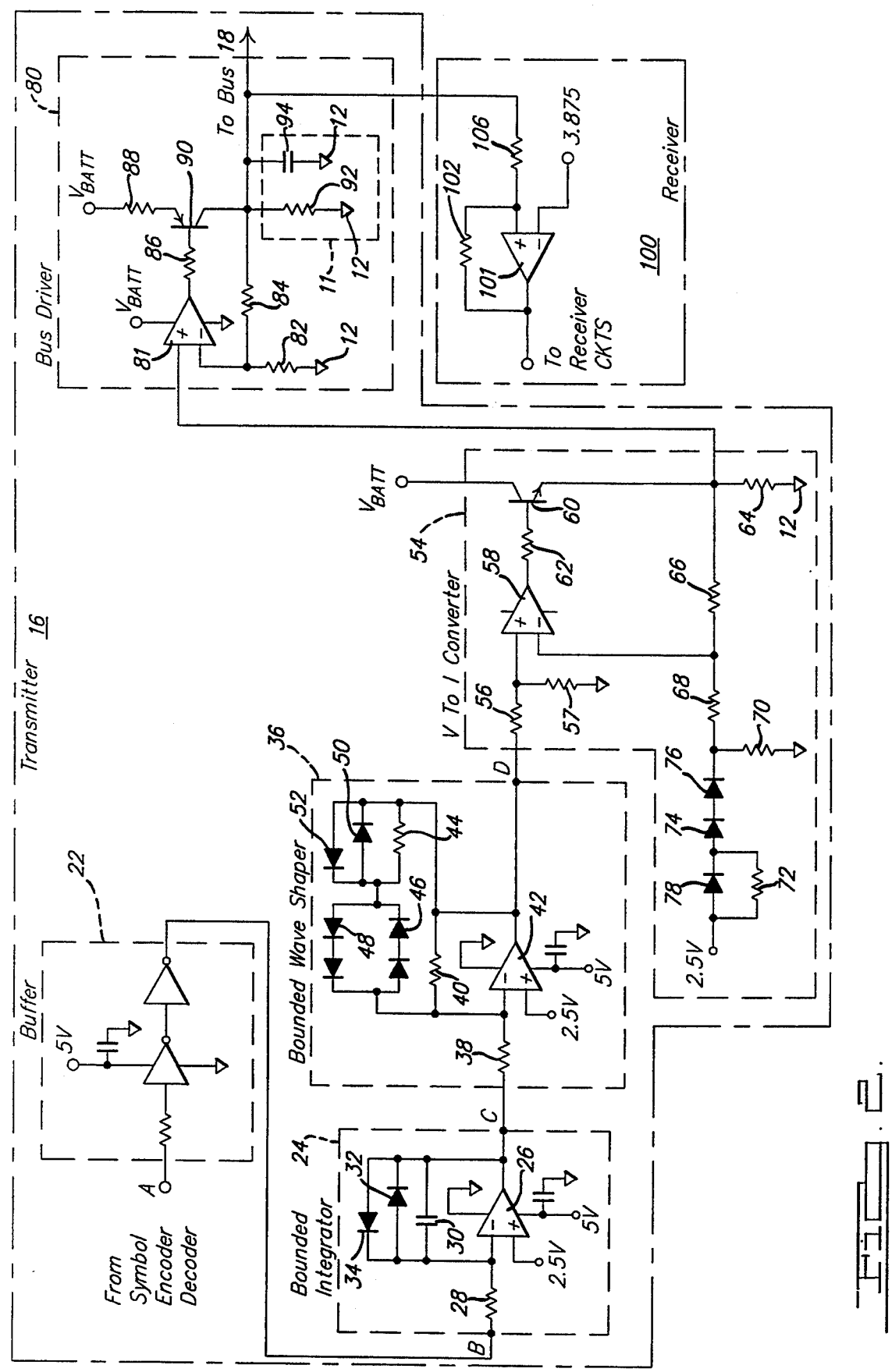

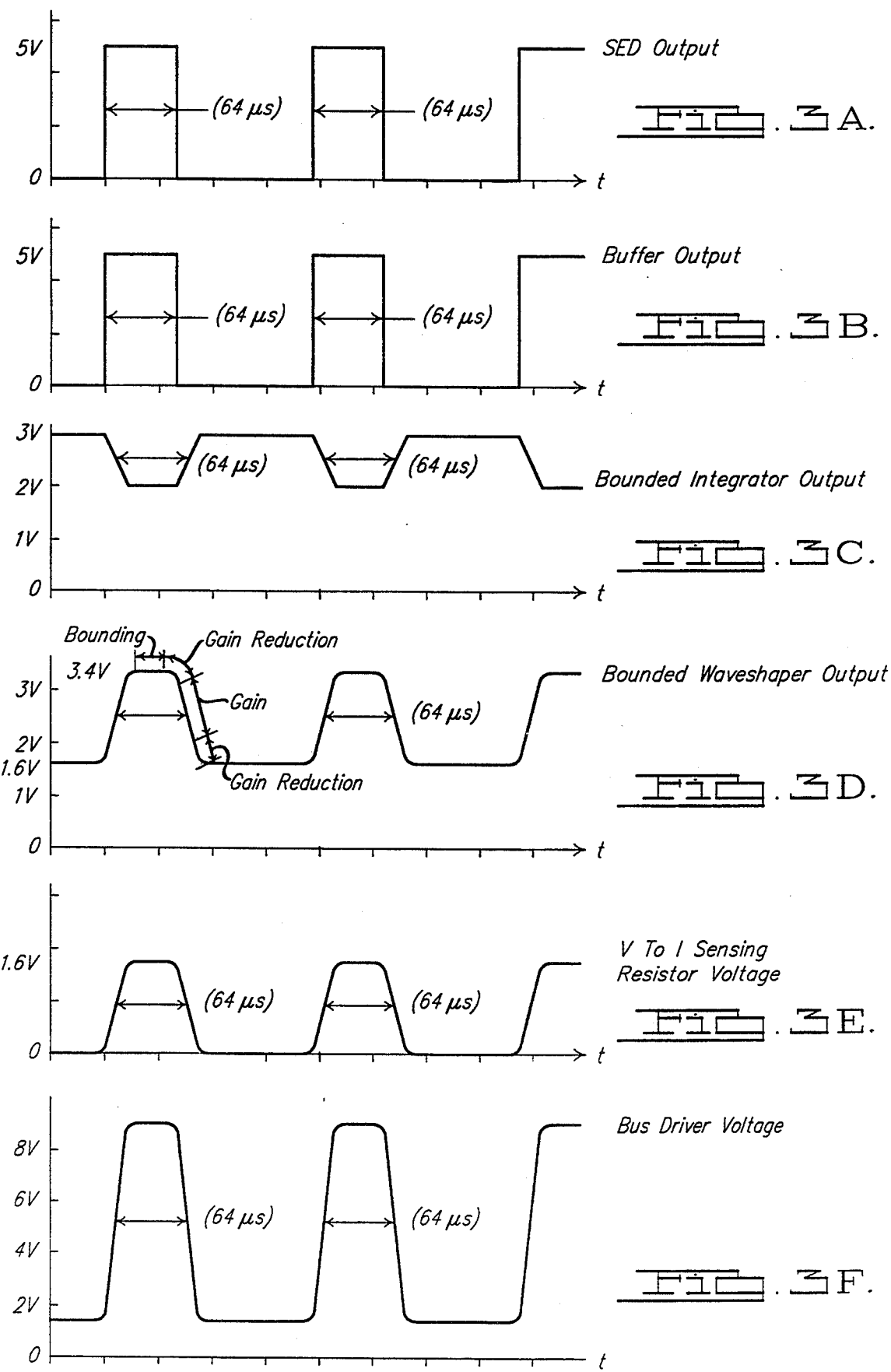

VEHICLE COMMUNICATIONS NETWORK TRANSCEIVER, TRANSMITTER CIRCUIT THEREFOR

BACKGROUND OF THE INVENTION

Due to the continual use of more and more electronics in vehicles, the Society of Automotive Engineers (SAE) encouraged the entire automotive industry to develop a standard data link, preferably a medium-speed (Class B) multiple access serial communications link. Already, SAE has established Recommended Practice J1850 (a set of technical requirements and parameters) and the industry has accepted a Class B data link as a J1850 as the recommended practice.

J1850 specifies use of symbols for communicating serial data over a communications bus. In variable pulse width modulation (VPWM) encoding, as used in the present invention, a symbol comprises a voltage logic level that extends for a period of time and then a voltage transition or edge occurs.

The amount of time between trip points of the previous edge and the current edge defines the meaning of the symbol. For example, a logic zero bit which can be either a short low of 64 $\mu$s or a long high of 128 $\mu$s represents the time between edges or transitions of the VPWM signal. J1850 specifies 3.875 volts as a nominal receiver trip point voltage parameter.

To minimize EMC problems during each transition of waveforms containing symbol information, waveshaping of the VPWM edges must take place. To satisfy RFI requirements of signals that reach the bus, each edge must have a certain slope and corner shape.

Within a transceiver, problems result in trying to maintain consistent transmitted trip points. Since the trip point of the previous edge provides the point of reference for the current edge, a problem occurs if the trip points of the transitions occur at different times.

J1850 specifies that communication buses may be two wires routed adjacently or twisted pairs dispersed throughout the network.

In prior systems, reshaping VPWM pulses to satisfy RFI requirements occur but usually without considering maintaining consistent transmitted pulse trip-points. Probably the prior system designers focus more attention to problems of voltage offset between nodes rather than transmitting clean pulses.

In an effort to minimize distortion of symbol time spans, a search took place to find other schemes which compensated for symbol time span distortion. This search resulted in the present invention which establishes consistent trip points along the edges of pulse signals placed on a communications data line.

SUMMARY OF THE INVENTION

The present invention concerns a novel symbol time transfer device in a J1850 VPWM symbol communication network. This device converts variable pulse width modulated symbol information to symmetrical trapezoidal waveforms that maintain consistent symbol information between voltage trip points of pulse edges. With twisted pairs serving as a communications bus, noise problems stay reasonably low and the symbol information remains constant from node to node when referenced with respect to the signal ground return at the receivers.

IN THE DRAWINGS

FIG. 2 depicts, in schematic diagram form, a portion of the transmitter circuit of the transceiver; and FIGS. 3A–3F illustrate waveforms of signals occurring in the transmitter circuits of FIG. 2.

DETAILED DESCRIPTION OF A PREFERRED EMBODIMENT

Communications Network

Figure 1:
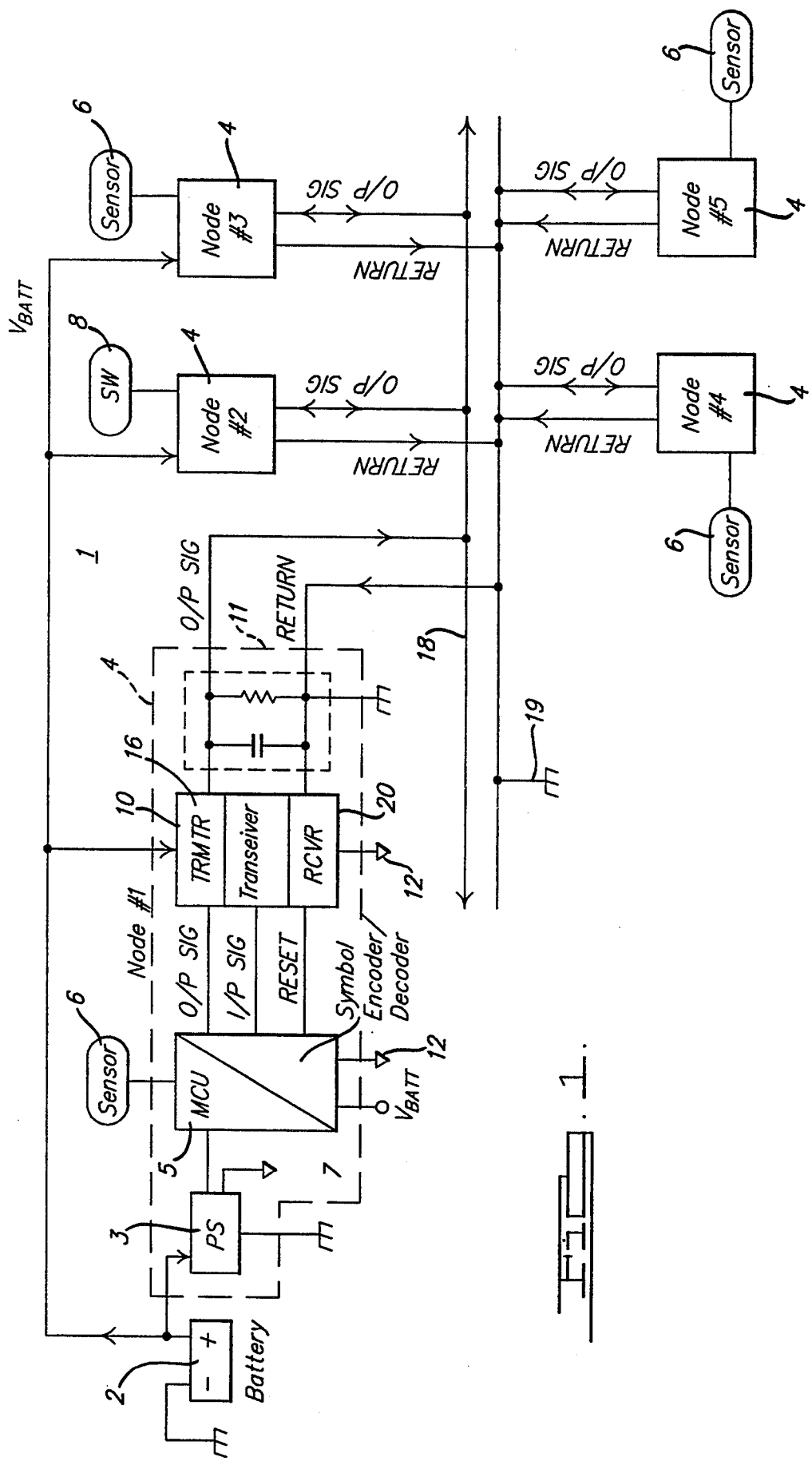
FIG. 1 illustrates, in block diagram form, a communications network employing a transmitter circuit of this invention in a transceiver.

FIG. 1 depicts a block diagram of a vehicle small area network 1 including a transceiver of the present invention. With the negative terminal grounded to the chassis of a vehicle, battery 2 supplies battery power ($+V_{batt}$) to the network nodes.

Each 5-Volt dc regulated power supply 3 of nodes 4—4 receives $V_{batt}$ and provides at an output terminal suitable regulated 5 Vdc to a plurality of signal conditioning circuits. In addition to regulated power source 3, each node 4 contains a microcontroller (MCU) 5, preferably a conventional 8-bit, single-chip microcontroller, a suitable symbol encoder/decoder(SED) 7, a transceiver 10 and a termination network 11.

MCU 5 receives sensor or switch signals and then uses these signals to generate control signals for manipulating SED 7 to produce a plurality of message symbols in a suitable VPWM format. Transceiver 10, interfaced with bus 18 through a termination network 11, accepts the message symbols from SED 7 and transmits the symbols over bus 18 in VPWM format to another node 4.

Bus 18, a twisted wire bus, depends on a large number of turns of twist wire to minimize noise. It routes throughout the small area network as twisted wire connected to twisted wire extensions depending from each node.

FIG. 1 depicts, in block diagram form, a communications network 1 with several nodes 4—4 employing the transceiver 10. Twisted-wire bus 18 interconnect nodes 4—4. Transceiver 10 includes both transmitter (TRMTR) 16 and receiver (RCVR) 20 circuits.

The Transmitter Circuit

With reference now to FIG. 2, this figure depicts, in schematic form, transmitter 16 that includes a bus driver circuit 80. Also, FIG. 2 shows the interconnection of receiver 100 of transceiver 10 to the output of the bus driver circuit.

Bounded Integrator

VPWM signals from SED 7 enter transmitter 16 at terminal A and route through a conventional buffer 22 and out of terminal B to a bounded integrator 24. Integrator 24 produces at an output port C symbol signals having edges with lengthened rise and fall times, reduced amplitudes and established trigger point voltages. These parameters maintain each symbol length equidistant with respect to the pulse width of the symbol expressed in the square-wave input waveform. Integrator 24 produces at port C inverted, linear, and bounded pulses symmetrical about the trigger-voltage level of the pulse edges in response to square-wave signals at the inverting input terminal of operational amplifier 26. A reference voltage of about 2.5 Vdc applies to a non-inverting input terminal of amplifier 26 having a chosen voltage gain. This reference voltage establishes the trigger-point-voltage from which each rising pulse edge extends about 0.5 Vdc above and each falling edge extends about 0.5 Vdc below the trigger-point voltage forming bounded voltage levels. Diodes 32 and 34 connected in the feedback loop of amplifier 26 accomplishes the bounding function. By fixing the trigger point at a fixed voltage and by bounding the amplitude of the pulses, substantially equal voltage amplitudes above and below the trip points result. This operation changes square wave pulses into trapezoidal pulses.

Bounded Waveshaper

Increasing the curvature of the pulse corners of the waveform at point C provides further reductions of EMI on bus 18. The output signal from bounded integrator 24 at point C encounters input resistor 38 of a conventional op-amp inverter circuit 42 of the bounded waveshaper device 36. As in conventional op-amp inverters, both input and feedback signals apply at the inverting input terminal of op-amp 42. Due to op-amp restraints, the voltage at the inverting input (Vn) must equal the voltage at non-inverting input (Vp) of the op-amp 42. Since Vp, in this configuration equals 2.5 Vdc, any voltage change of Vn changes with respect to Vp rather than a ground offset voltage. Thus, if input resistor 38 senses a negative directed ramp voltage from integrator 24, then op-amp inverter 42 will produce a positive directed ramp voltage of closed loop gain (K) referenced about 2.5 vdc, the trip-point voltage. If input resistor 38 senses a positive directed ramp voltage, then op-amp inverter 42 will produce a negative directed ramp voltage of closed loop gain(-K) referenced about the trip-point voltage.

Voltage Gain Reduction

Also, waveshaping device 36 employs, along with the op-amp inverter 42, voltage gain reduction circuits to further increase the curvature of pulse corners of waveforms during the waveshaping process. Resistor 44 and diode circuits 46 and 48 form the voltage gain reduction circuit which shunts feedback resistor 40. This voltage gain reduction circuit reduces close loop gain when negative or positive directed ramp voltages appearing at the output of op-amp inverter 42 reaches a first predetermined voltage level.

Bounding the Voltage Gain Reduction

Along with voltage gain reduction, bounding the amplitudes of the reshaped pulse corners occurs. When the negative or positive directed ramp voltage reaches a second predetermined level, forward biasing bounding diodes 50 or 52 causes the ramp voltages to level off to the clamping voltage established by the bounding diodes 50 or 52 and the complimenting diode circuits 46 or 48. Hence, a reshaped output waveform signal appears at point D which includes increased curvature corners and increased amplitudes of the pulses with respect to the trip-point voltage.

Voltage To Current Converter

The reshaped output pulse signals at point D enter voltage-to-current converter device 54 and exit as programmed current-sink signals used by an associate device discussed infra. Illustratively, for this illustrated symbol pulse, the pulse signal at point D has a 1.60 VDC offset, an amplitude of 1.8 $V_{p-p}$, a trip-point voltage of 2.50 VDC and a pulse width (PW) remaining at 64 μs.

A voltage divider network consisting of resistors 56 and 57 receives the pulses from point D, halves the amplitude to 0.9 $V_{p-p}$, with a 0.8 VDC offset, a 1.25 trip-point voltage and a 64 μs PW and then applies the lowered signal to a non-inverting input terminal of a non-inverting op-amp 58.

A sensing resistor 64 used for feedback control of the output current responds to a pulse in the emitter circuit of an NPN buffer transistor 60 of about 1.60 $V_{p-p}$ with respect to signal ground 12.

An offset voltage circuit consisting of diodes 78, 74 and 76, along with resistors 72 and 70, provide a fixed offset voltage of about 1.60 VDC at the cathode of diode 76. Resistor 68, part of the feedback circuit along with feedback resistor 66, causes a corresponding pulse near 1.60 $V_{p-p}$ with a 0.80 VDC offset at the inverting input terminal of op-amp 58.

Op-amp 58 outputs a pulse of about 2.5 $V_{p-p}$, in phase with the pulse at the non-inverting input terminal, in response to the voltage difference between the input pulses at the non-inverting and inverting input terminals. This reaction subtracts 1.60 VDC from the signal at point D causing the trip-point to occur at about 0.9 VCD at the emitter of transistor 60. The output voltage of op-amp 58 supplies base current to the NPN buffer transistor 60 through base resistor 62. Emitter voltage of transistor 60 generates a feedback voltage across current sampling resistor 64 of a chosen value and a system ground potential. Output current of the circuit routes through sampling resistor 64 and feedback current routes through feedback resistor 66. Any tendency for the output current to change will appear as a change in the emitter voltage of transistor 60. This change is fed back to an inverting input terminal of op-amp 58 through feedback resistor 66 resulting in a correction which restores both the emitter voltage and the output current to quiescent close-loop values.

Bus Driver Circuit

The bus drive circuit 80 operates as a voltage variable current source circuit. The variable voltage across current sensing resistor 64 of voltage-to-current circuit 54 enters the non-inverting terminal of difference op-amp 81. Op-amp 81 compares the variable voltage to a divided-down emitter voltage of bus driver transistor 90. Resistors 82 and 84 form the dividing network. The voltage at the inverting terminal results from an output current from op-amp 81 which varies the current of the input loop of transistor 90. The input loop includes resistors 86, 84, and 82.

The output loop of transistor 90 includes current from Vbatt that flows through resistor 88 and from collector to emitter to bus 18. Resistor 92 and capacitor 94 form the termination network 11 of bus 18.

If current from op-amp 81 causes the collector-to-emitter voltage (Vce) of transistor 90 to reach nearly zero, then transistor 90 saturates and the maximum current that can flow in the output loop flows onto bus 18. Otherwise, transistor 90 operates in the active or amplifying mode provided the amplifying factor (B) times the base current $I_b$ stays less than the maximum saturation current ($I_c$,sat). However, if the base-to-emitter voltage (Vbe) of transistor 90 goes below the turn ON voltage (Vt), then very little, if any, current will flow in the output loop. This causes transistor 90 to operate in the cutoff mode. The resulting waveform will yield amplified pulse signals at bus 18 with trip points occurring around 3.875 VDC with the symbol timing remaining at 64 μs.

Receiver Circuit

Current on twisted-wire bus 18 provides trapezoidal signals that preserve substantially the original symbol information at the trip points between pulse edges. Receiver 100, consisting of comparator 101 biased by resistors 102 and 104 to trigger at the trip-point of the pulses, receives these trapezoidal signals. Comparator 101 triggers to convert the trapezoidal signals into digital pulses, used by SED 7 of FIG. 1, to generate digital messages that route to each microcontroller 5 in each node 4—4.

Waveform Diagrams

To further explain the operation of system 10, refer now to waveform diagrams of FIGS. 3A through 3F. FIG. 3A illustrates the VPWM symbol signal that enters transmitter 16 of FIG. 1 from SED 7. Symbol data in square wave pulses entering transmitter 16 have pulse widths varying from about 16 μs to as much as 1024 μs. Pulses in FIG. 3A depict a dominant short symbol having a pulse width of 64 μs.

FIG. 3B illustrates the same symbol message depicted in FIG. 3A at the output of buffer 22 and at point B of FIG. 2. However, FIG. 3C shows the trapezoid signal at the output of bounded integrator circuit 24 of FIG. 2.

FIG. 3D shows the trapezoid signal with its edges reshaped at the extremities of the pulses edges, with some gain, after passing through the bounded waveshaper circuit 36 of FIG. 2. While FIG. 3E shows the pulses appearing in the feedback network of the Voltage-to-Current Converter 54, these pulses appear across the terminals of sensing resistor 64.

FIG. 3F depicts the pulses at the output of Bus Driver 90. The pulses have a voltage amplitude of about 4 times that appearing across sensing resistor 64 in voltage-to-current converter 54.

It is to be understood that the above-described embodiment mainly illustrates the principles of the present invention. Although a combination discrete component/integrated circuit embodiment is disclosed, a combination integrated circuit/firmware/software equivalent could be developed. One skilled in the art may make changes and modifications to the embodiment disclosed herein and may devise other embodiments without departing from the scope and essential characteristics thereof.

What is claimed is:

1. A transceiver in nodes of a multiple node vehicle communications network having a communications bus prescribed for use in an automotive industrial standard data link, interconnecting the nodes, each node providing means for translating a chosen measurand into digital pulses appearing at varying rates in response to changes of the measurand into symmetrical, variable pulse width modulated (VPWM) trapezoidal shaped waveform signals containing symbol information expressing the magnitudes of the measurand, each node containing a regulated power source connected to a vehicle battery to provide regulated logic voltages referenced with respect to a signal ground return; each node also containing a microcontroller (MCU) connected between the input device and a symbol encoder decoder (SED) for receiving signals representing magnitudes of the measurands, formatting the received signals into digital messages, polling input and output ports connected to the SED, and initiating transmission over the bus via the SED, the SED being interconnected between the MCU and the transceiver for translating the digital messages from the MCU into variable pulse width modulated (VPWM) square wave line codings sent to other transceivers connected to the bus and for converting square wave digital signals received from other transceivers into digital messages used by the MCU for updating or controlling other peripherals associated with the network, said transceiver comprising:

(a) an integrator with an input for receiving the VPWM square-wave pulses from SED having pulse widths that define symbol information with respect to time and logic levels and producing at an output terminal trapezoid type waveform signals with pulses 180 degrees out of phase with the square wave pulses and referenced with respect to a fixed voltage level;

(b) a waveshaper having an input for receiving the trapezoid waveform signals from the integrator and reshaping both corners at the extremities of each edge of the pulses over a chosen duration and then producing at an output terminal other trapezoid waveform signals in phase with the input waveform signals having the same pulse width as the input trapezoid signals at trip point voltage so as to retain the symbol information contained in the original square-wave signals, the reshaped trapezoid signals being referenced with respect to another fixed voltage level;

(c) a voltage-to-current converter having an input for receiving the reshaped trapezoid waveform signals from the waveshaper, and providing at an output a replica of the reshaped trapezoid waveform signals as control current source signals, said control current source signals being routed to a current sensor circuit within the voltage-to-current converter to provide pulse voltage potentials with respect to signal ground return of magnitudes proportional to the voltage across the current sensor;

(d) a bus driver connected between the battery of the vehicle and the signal ground return having an input for receiving the pulse voltage potentials from said voltage-to-current converter and producing at a single-ended output amplifications of the reshaped trapezoid pulse signals referenced with respect to the signal ground return which route over the bus to other listening nodes, said amplified signal retaining the symbol information contained in the original square-wave pulse signals; and (e) a receiver circuit interconnected between the bus and SED for receiving reshaped trapezoid waveform signals from the bus and extracting symbol information contained in the waveform signals and converting the extracted symbol information into digital pulse signals with pulse durations equivalent to the symbol information.

2. Apparatus as defined in claim 1 wherein the communications bus is a twisted pair wire bus.

3. Apparatus as defined in claim 1 wherein the symbol information remains constant in the reshaped trapezoid waveform signals received by each receiver in each transceiver despite the fact the symbol information in the reshaped trapezoid pulses relates to the signal ground returns in each node.

4. Apparatus as defined in claim 1 wherein the integrator includes circuits for lengthening the rise and fall times of the edges of the input square wave pulses to produce symmetrical rise and fall time slopes about a chosen maximum pulse amplitude location and wherein the amplitudes of the pulses being bounded are at chosen voltage levels.

5. Apparatus as defined in claim 4 wherein the waveshaper provides gain and controlled gain reduction operations so as to further round the corners of the pulses at the extremities of each edge in forming the reshaped trapezoid pulses and wherein the provided gain produces bounding of the pulses at a chosen voltage amplitudes greater than the amplitudes of the bounded pulses from the integrator.

6. Apparatus as defined in claim 5 wherein the bus driver output pulses have amplitudes of a chosen multiple of the amplitude of the pulses across the sensor in the current-to-voltage converter.

7. Apparatus as defined in claim 6 wherein the chosen multiple of the amplitude of the driver output pulses is about four times that of the amplitude of the output pulses from the current-to-voltage converter.

8. A node transceiver of a multinode network having a communications bus interconnecting the nodes permitting asynchronous communication between nodes providing to the network information from input devices such as sensors and switches, each node connected to the bus having (1) a regulated power source connected to a fixed voltage to provide regulated logic voltages referenced with respect to a signal ground return, (2) a microcontroller (MCU) connected between the input devices associated with the node, a symbol encoder decoder (SED) and the regulated power source for receiving signals representing magnitudes of the measurands, formatting the received signals into digital messages, polling input and output ports connected to the SED, and initiating transmissions over the bus by controlling the operations of SED, and (3) the SED interconnected between the MCU and the transceiver for translating the digital messages from the MCU into variable pulse width modulated square-wave signals sent to other transceivers connected to the bus and for converting the square-wave digital signals received from other transceivers into digital messages used by the MCU for updating or controlling other peripherals associated with the network, said transceiver comprising:

A. integrating means for converting the VPWM square-wave pulse signals received from SED into a decreased amplitude, 180 degrees out-of-phase trapezoid waveform signals referenced with respect to bounding fixed voltage levels, the trapezoid waveform signals having consistent pulse widths at chosen trigger points which continues to define the symbol information placed in the original square-wave pulses;

B. waveshaper means coupled to the integrator means for intercepting and then reshaping the corners at the extremities of each edge of the pulses of the trapezoid waveform signals, and providing gain and controlled gain reduction parameters, yet retaining the consistent pulse width at the trigger points of the pulses;

C) voltage-to-current converter means for using the reshaped trapezoidal waveform signals to provide varying control current source signals with respect to signal ground return in response to changes in amplitude and duration of the reshaped trapezoid waveform pulse signals; and D) bus driver means responsive to the varying control current source signals for proving amplified reshaped pulse signals which route to the bus providing symbol messages on the bus that minimizes electromagnetic interference in the vehicle.

* * * * *